United States Patent [19]
Rao

[11] Patent Number: 5,828,905
[45] Date of Patent: Oct. 27, 1998

[54] ADAPTER AND METHOD OF CONNECTING DEVICES ASSOCIATED WITH AT LEAST THREE DIFFERENT PROTOCOLS

[75] Inventor: Mahesh Chandra Rao, San Jose, Calif.

[73] Assignee: Mitsubishi Chemical America, Inc., San Jose, Calif.

[21] Appl. No.: 556,675

[22] Filed: Nov. 13, 1995

[51] Int. Cl.[6] .................................................. G06F 15/02
[52] U.S. Cl. ............................................................ 395/883
[58] Field of Search .................................... 395/500, 800, 395/831, 882, 883, 828, 309, 829, 884, 284, 306

[56] References Cited

U.S. PATENT DOCUMENTS

| | | | |
|---|---|---|---|
| 4,686,506 | 8/1987 | Farago | 341/100 |
| 4,852,041 | 7/1989 | Nakano | 395/500 |
| 4,981,438 | 1/1991 | Bekhiet | 439/76.1 |
| 5,030,128 | 7/1991 | Herron et al. | 439/372 |
| 5,123,092 | 6/1992 | Buxton et al. | 395/287 |
| 5,218,683 | 6/1993 | Jerrim et al. | 395/285 |
| 5,299,314 | 3/1994 | Gates | 395/884 |
| 5,343,319 | 8/1994 | Moore | 359/152 |
| 5,396,225 | 3/1995 | Okada et al. | 463/40 |
| 5,406,450 | 4/1995 | Shieh | 361/686 |
| 5,460,547 | 10/1995 | Belt et al. | 361/686 |
| 5,485,590 | 1/1996 | Hyatt et al. | 395/800.37 |

*Primary Examiner*—Moustafa M. Meky
*Attorney, Agent, or Firm*—Oblon, Spivak, McClelland, Maier & Neustadt, P.C.

[57] ABSTRACT

A method and apparatus for connecting a computer to one or more peripheral devices includes providing an adapter module connectable directly or by means of standard cabling to a peripheral device. The adapter module includes a plurality of electrical connectors configured to operate in accordance with predetermined interface protocols. A conversion means provided in the module in the form of an ASIC chip performs protocol conversions. By providing three or more connectors on the adapter module, several devices can be connected to a computer having a single port.

30 Claims, 3 Drawing Sheets

ADAPTER AND METHOD OF CONNECTING DEVICES ASSOCIATED WITH AT LEAST THREE DIFFERENT PROTOCOLS

FIELD OF THE INVENTION

This invention relates to a method and apparatus for connecting a plurality of devices for communication with each other.

BACKGROUND OF THE INVENTION

Computers are typically connected to peripheral devices by means of cables extending between the computer and the devices and between the devices themselves. Various connectors and interface protocols have developed over the years, thus making it necessary to provide adapters for converting from one protocol to another. For example, a lap top computer may be provided with only a parallel port, and the need may arise to connect an optical disk drive that has only a SCSI port. The prior art teaches the use of dedicated cables having appropriate connectors at their ends and being provided with an ASIC (application specific integrated circuit) to perform the protocol conversion.

The problem associated with the prior art is that the cable, having only two ends, is limited to connecting a computer to a single device. Furthermore, the flexibility of the cable makes it inherently unreliable, the relative movement between the cable and the connectors at its ends frequently resulting in cable break down. Since the cables are dedicated to perform a specific conversion process from one interface protocol to another and are provided with ASIC chips, their cost is invariably significantly higher than that of a general purpose cable performing no protocol conversion.

The present invention seeks to provide a solution to the above problems.

OBJECTS AND SUMMARY OF THE INVENTION

It is an object of the invention to provide an adaptor for interface protocol conversions, which is less susceptible to break down. In particular, it is an object of the invention to provide a rigid support for a plurality of different connectors and an ASIC chip for performing protocol conversions between the various connectors.

It is a further object of the invention to provide a method of using standard non-dedicated cables and performing protocol conversions independently of the cables.

It is yet another object of the invention to mount the various connectors of the adaptor on a housing and to include three or more connectors thereby permitting a plurality of external devices to be daisy chained together.

According to the invention there is provided an adapter for connecting a plurality of devices, comprising a support structure; at least three connectors connected to the support structure, each connector being configured to operate in accordance with a predetermined interface protocol; conversion means connected to the connectors for converting from one interface protocol associated with one of the connectors to at least one other interface protocol corresponding to the protocols associated with the other connectors.

The support structure can comprise a housing. The housing can have an external surface and at least one of the connectors can be arranged relative to the external surface for engagement with a complementary connector on an associated one of the devices.

The housing can include engagement means on its external surface and at least one of the devices can have complementary engagement formations complementarily engagable with the engagement means of the housing to securely retain said at least one device with the engagement formations relative to the housing.

The conversion means may include an application specific integrated circuit chip.

The connectors can include a SCSI port, a wide SCSI port, a fast SCSI port, a serial port, a parallel port, an RS232 port, an Ethernet port, a 10 Base T port, an IPI port, an IDE port, an EIDE port, a TCPIP port, or a coaxial cable port. At least one of the connectors can comprise a wireless connector port. The wireless connector port can comprise an infrared port or a radio frequency port.

The devices can include a computer, a memory device, a printer, or a modem. The memory device can comprise a read-only memory or a read-and-write memory, such as a ROM chip set, a RAM chip set, a hard disk drive, an optical disk drive, a removal hard disk drive, a tape drive, or a CD family drive.

The adapter can comprise a storage means for temporarily storing information received by the connectors.

Further, according to the invention there is provided an adapter for connecting a plurality of devices, comprising a housing defined by an outer wall; a plurality of connectors secured to the outer wall of the housing, each connector being configured to operate in accordance with a predetermined interface protocol, and conversion means mounted relative to the housing for converting from one interface protocol associated with one of the connectors to at least one other interface protocol associated with the other connectors.

The adapter can include two connectors.

The housing can have an external surface and at least one of the connectors can be arranged relative to the external surface for engagement with a complementary connector on an associated one of the devices.

Still further, according to the invention there is provided a memory system for a computer, comprising a memory module and an adapter module, wherein the memory module includes a memory housing, and the adapter module includes an adapter housing, the housings having complementary communication ports for electrical communication between the two modules, and one of the housings having cartridge retaining means on an outer surface of the housing for retaining at least one memory disk or cassette, the disk or cassette serving to store information and facilitate the read of such information by the memory module.

The housings can have complementary connection means for physically connecting the housings to each other. The disk retaining means can comprise rails for slidably receiving the at least one disk or cassette.

The adapter module can include a plurality of electrical connectors mounted on the housing. At least two of the connectors can be configured to operate in accordance with different interface protocols, and the adapter module can include conversion means connected to the connectors for converting from one interface protocol associated with one of the connectors to at least one other interface protocol corresponding to the protocols associated with the other connectors.

The memory system can further comprise a storage means for temporarily storing information received by the connectors.

Still further, according to the invention is a method of connecting a plurality of devices for information interchange between the devices wherein at least two of the devices operate in accordance with different interface protocols, comprising providing a housing having at least two connectors mounted on the housing, at least two of the connectors being associated with different interface protocols, and connecting the plurality of devices to the housing, wherein the housing contains conversion means for converting between the interface protocols associated with the connectors.

At least one of the devices can be connected to the housing by means of a standard cable, the cable can have connectors at its ends associated with a single interface protocol.

The housing and at least one of the devices can be provided with complementary connectors and the housing and the at least one device can be shaped to permit direct engagement between the complementary connectors, and can further comprise connecting said at least one device directly to the housing.

At least one device connected directly to the housing can be retained relative to the housing by means of complementary engagement formations located on the housing and said at least one device.

DETAILED DESCRIPTION OF PREFERRED EMBODIMENTS

The present invention seeks to eliminate the problems associated with the prior art. In particular, the present invention proposes an adapter in the form of a module connectable either directly or by means of a standard cable to a computer and peripheral devices operating under different interface protocols. For purposes of this application, the term "standard cable" will be used to refer to a cable having connectors at its ends that are related to a single interface protocol, and wherein the cable performs no protocol conversion. This is to be distinguished from a dedicated cable known in the art in which the cable is provided with different connectors at its ends, each connector being associated with a different protocol, and the cable having an ASIC chip for performing a protocol conversion.

A specific embodiment is described in which an adapter module in accordance with the invention is connected directly to an optical disk drive and connected by means of a standard cable to a lap top computer. The adapter module is further provided with a number of other parts or connectors for connecting further peripheral devices to the computer. It will, however, be appreciated, that the invention is not limited to the connection of computers to memory devices such as read-only or read-and-write memory devices, including hard disk drives, optical disk drives, removable hard disk drives, tape drives, CD family drives like CDR, CDI, and CDE, jukeboxes, or ROM or RAM chip sets, etc. The present invention is equally applicable to other peripheral devices such as printers, modems, etc. Furthermore, the invention is not to be read as being limited to the specific electrical connectors and protocols discussed but applies equally to any other connector and protocol such as serial ports, parallel ports, RS232 ports, SCSI ports, wide SCSI ports, fast SCSI ports, Ethernet ports, 10 Base T ports, IPI ports, IDE ports, EIDE ports, TCPIP ports, coaxial cable ports, and wireless ports such as infrared or radio frequency connectors, to name but a few.

A specific embodiment is now described with reference to the accompanying drawings.

Figure 1:
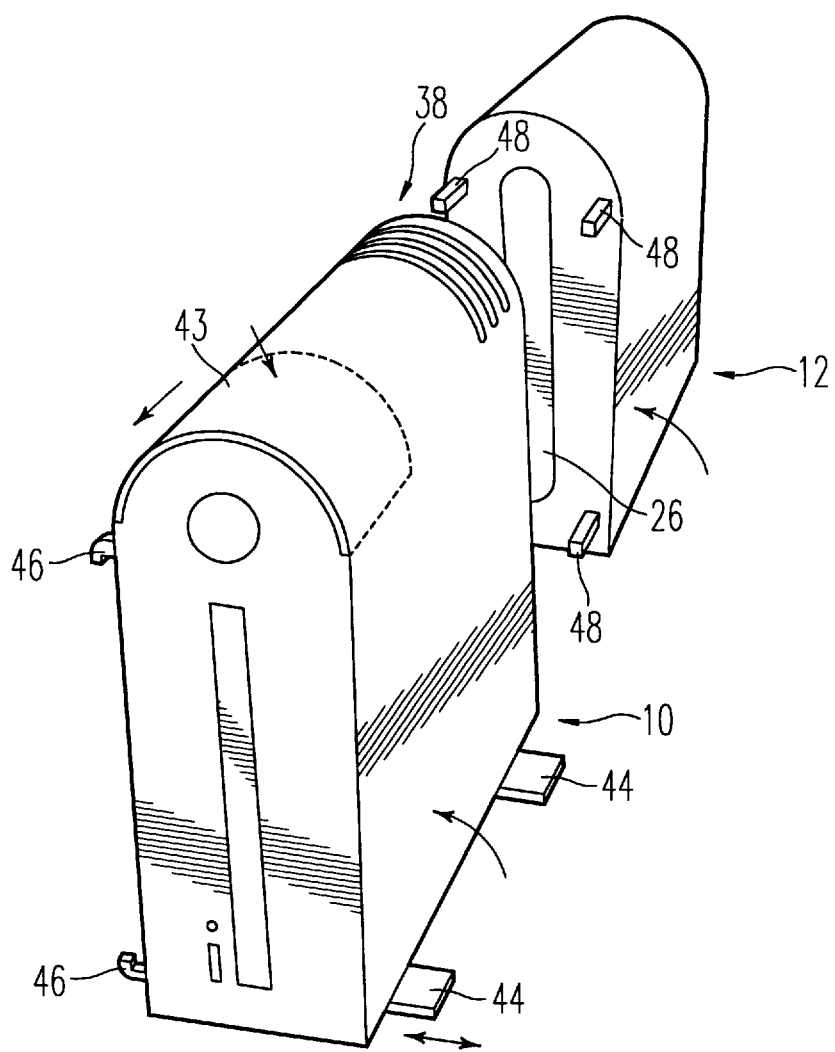
FIG. 1 is an isometric view of an optical disk drive and adapter module in accordance with the invention.
Figure 3:
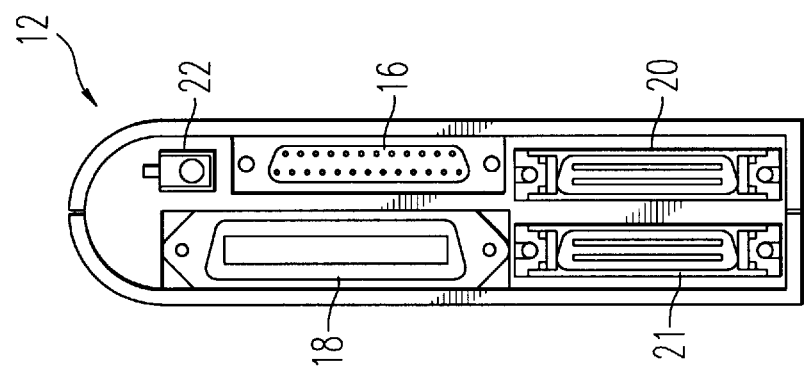
FIG. 3 is an end view of the adapter module of FIG. 2.
Figure 2:
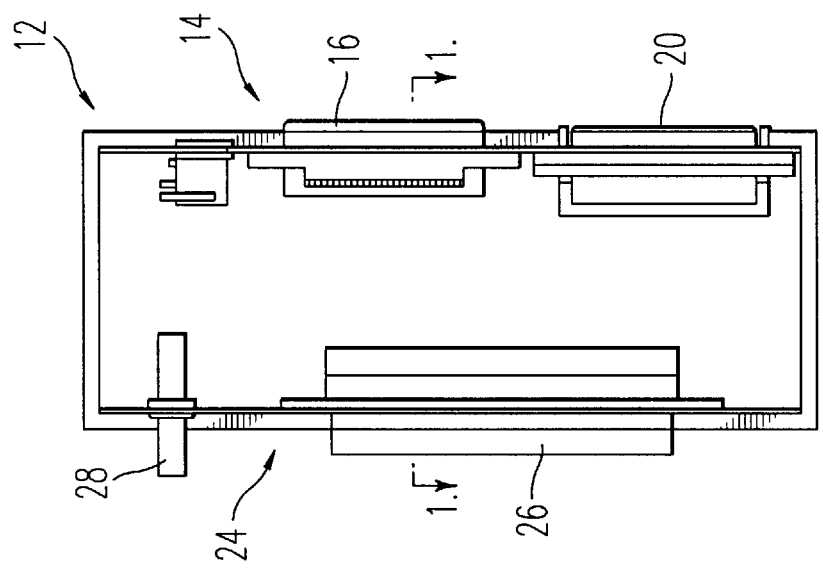
FIG. 2 is a sectional side view of the adapter module of FIG. 1.
Figure 4:
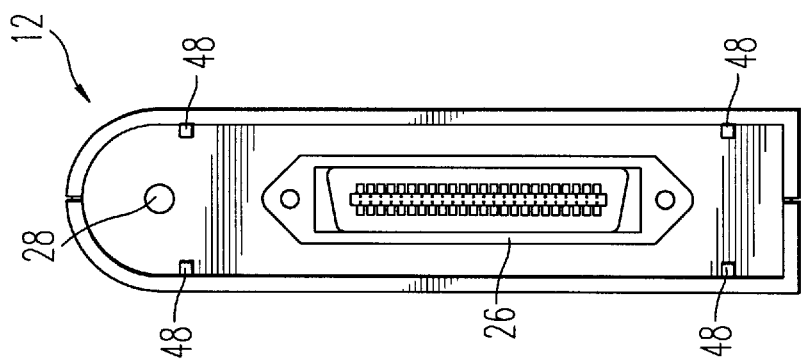
FIG. 4 is an end view from the opposite end of the adapter module of FIG. 2.
Figure 6:
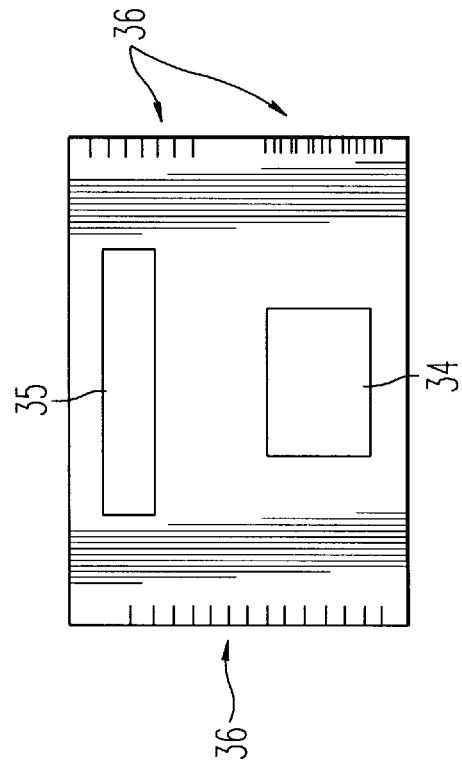
FIG. 6 is a schematic representation of a printed circuit board for use in an adapter module of the invention.

FIG. 1 shows an isometric view of an optical disk drive 10 and an adapter 12 in accordance with the invention. The adapter module 12 is typically connected by means of a standard cable (not shown) to a computer, and serves to convert from one interface protocol adopted by the computer to a second protocol adopted by the disk drive. The adapter module 12 is illustrated in greater detail in FIGS., 2–5. FIG. 2 shows a sectional side view of the adapter module 12. The one side 14, which in this example corresponds to the computer side and is show in detail in FIG. 3, includes a DB25 connector serving as a parallel port for connection to a parallel port of a computer. The side 14 further includes a SCSI 36 pin connector 18 and two micro SCSI connectors 20, 21. A DC jack 22 is also provided. It will be appreciated that this is merely an illustrative example and that the module 12 could have a different number and different types of connectors. The opposite side, which in this example, corresponds to the disk drive side 24 supports a 50 pin SCSI connector 26 which is illustrated more clearly in FIG. 4. It also supports a DC plug 28. Again, the invention is not limited to the type of connectors illustrated in this embodiment and could include different types of connectors and more or less than two connectors. Mounted within the housing of the adapter module 12 is a printed circuit board 32 that supports an ASIC chip 34 as illustrated in FIG. 6. The chip 34 is connected by means of bus lines (not shown) to edge connectors 36 for connection to various connectors on sides 14 and 24 of the module 12. The ASIC chip 34 serves to perform protocol conversions from one connector to another. Such ASIC chips are commonly known in the art and are readily available from companies such as Shuttle Technologies, Inc. The printed circuit board also supports a temporary storage means 35. The temporary storage means can consist of a number of RAM chips, which serve as a buffer for information sent to the module 12 via the various connectors or ports. It will be appreciated that a buffer or cache could equally well be connected externally instead of being mounted on the PC board.

Figure 7:
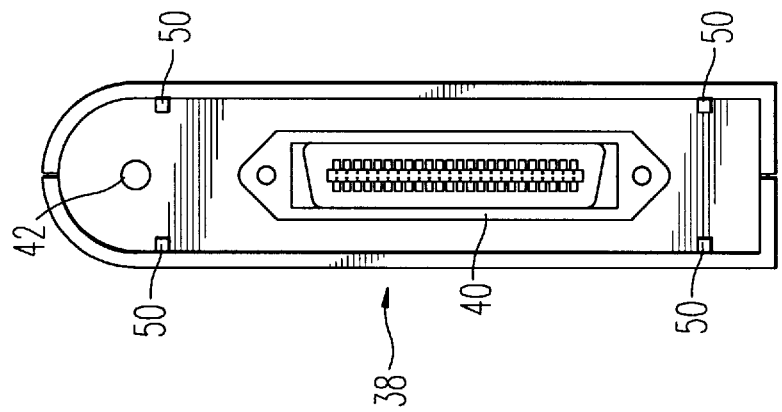
FIG. 7 is an end view of the optical disk drive of FIG. 1.
Figure 5:
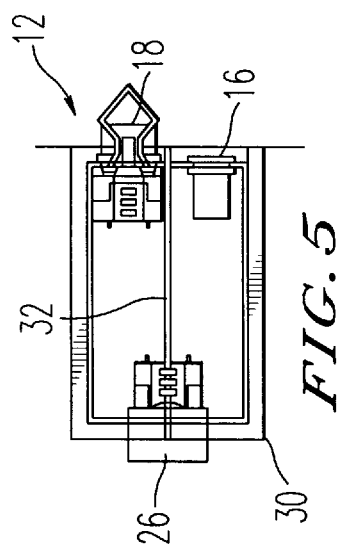
FIG. 5 is a plan view of the adapter module of FIG. 2.

Referring again to FIG. 1 and to FIG. 7, the disk drive 10 is provided with a 50 pin SCSI connector 40 (as illustrated in FIG. 7) for complimentarily engaging the connector 26 of the adapter module 12. The side 38 of the drive 10 further includes a DC socket 42 for receiving the DC plug 28 of the adapter module 12. The disk drive 10 also includes a slidable cover 43 (FIG. 1) providing access to dip switches and SCSI identification switches (not shown). Furthermore, the drive 10 includes slidably mounted legs 44 to support the disk drive more securely on its edge. Another feature included to enhance the compactness of the system as a whole is the provision of rails 46 for slidably receiving portable storage media such as optical disks or cassettes. This allows extra disks or cassettes to be secured to the body of the drive 10. Clearly, the invention is not limited to rails. Any suitable attachment means, for example clips, could be provided on the drive 10, or on the adapter module 12.

In practice, the adapter module is simply connected to the end 38 of the drive 10 and is held in place by virtue of the connector 26, which engages the connector 40. Resilient retaining hooks 48 on the module 12 (FIG. 1) engage complementary recesses 50 (FIG. 7) in the end 38 of the drive 10 to securely mount the adapter module 12 on the device 10. The module 12 is, in turn, connected either directly to the computer, such as a lap top computer, or by means of a standard connector cable extending from the parallel port of the computer to the DB 25 connector 16 of the module 12. It will be appreciated that the connectors 18, 20, 21 can be connected to other peripheral devices thereby allowing the computer to communicate with such other devices. In another embodiment a further 50 pin SCSI connector can be provided for connecting another identical optical disk drive to the adapter module. Thus by providing 3 or more connectors on the adapter module 12, several peripheral devices can be connected to a computer and several memory devices could, for example, be daisy chained together.

As mentioned above, a wide range of connectors could be provided on the adapter module with appropriate printed circuit boards and appropriate ASIC chips being provided for converting from one protocol to another. The adapter module could, for example, support SCSI, wide SCSI, fast SCSI RS232, serial, parallel, Ethernet, 10 Base T, IPI, IDE, EIDE, TCPIP, coaxial cable or wireless connectors such as radio frequency or infrared connectors. Furthermore, a variety of devices could be connected to a computer or daisy chained together. For example, memory devices including read-only and read-and-write memory devices, such as ROM or RAM chip sets, jukeboxes, hard disk drives, optical disk drives, removable hard disk drives, tape drives, CD family drives such as CDR, CDI, and CDE, etc. and other devices such as printers or modems, to name a few, could be connected to a computer or to each other.

I claim:

1. An adapter for connecting a plurality of devices, comprising:
    a support structure;
    at least three connectors connected to the support structure, each connector being configured to operate in accordance with a respective first, second and third different protocol; and
    conversion means connected to the connectors for converting between said respective first, second and third protocols associated with said at least three connectors,
    wherein the conversion means includes an application specific integrated circuit chip.

2. An adapter of claim 1, wherein the support structure comprises a housing.

3. An adapter of claim 2, wherein the housing has an external surface and at least one of the connectors is arranged relative to the external surface for engagement with a complementary connector on an associated one of the devices.

4. An adapter of claim 3, wherein the housing includes engagement means on its external surface and at least one of the devices has complementary engagement formations complementarily engagable with the engagement means of the housing to securely retain said at least one device with the engagement formations relative to the housing.

5. An adapter of claim 1, wherein the connectors include a SCSI port, a wide SCSI port, a fast SCSI port, a serial port, a parallel port, an RS232 port, an Ethernet port, a 10 Base T port, an IPI port, an IDE port, an EIDE port, a TCPIP port, or a coaxial cable port.

6. An adapter of claim 1, wherein at least one of the connectors comprises a wireless connector port.

7. An adapter of claim 6, wherein the wireless connector port comprises an infrared port or a radio frequency port.

8. An adapter of claim 1, wherein the devices include a computer, a memory device, a printer, or a modem.

9. An adapter of claim 8, wherein the memory device comprises a read-only memory or a read-and-write memory.

10. An adapter of claim 9, wherein the memory device comprises a ROM chip set, a RAM chip set, a hard disk drive, an optical disk drive, a removal hard disk drive, a tape drive, or a CD family drive.

11. An adapter of claim 1, further comprising a storage means for temporarily storing information received by the connectors.

12. An adapter for connecting a plurality of devices, comprising:
    a housing defined by an outer wall;
    at least three connectors secured to the outer wall of the housing, each connector being configured to operate in accordance with a respective first, second, and third different protocol; and
    conversion means mounted relative to the housing for converting between said respective first, second, and third protocol associated with said at least three connectors,
    wherein the conversion means includes an application specific integrated circuit chip.

13. An adapter of claim 12, wherein the housing has an external surface and at least one of the connectors is arranged relative to the external surface for engagement with a complementary connector on an associated one of the devices.

14. An adapter of claim 13, wherein the housing includes engagement means on its external surface and at least one of the devices has complementary engagement formations complementarily engagable to the engagement means of the housing to securely retain said at least one device with the engagement formations relative to the housing.

15. An adapter of claim 12, wherein the connectors include a SCSI port, a wide SCSI port, a fast SCSI port, a serial port, a parallel port, an RS232 port, an Ethernet port, a 10 Base T port, an IPI port, an IDE port, an EIDE port, a TCPIP port, or a coaxial cable port.

16. An adapter of claim 12, wherein at least one of the connectors comprises a wireless connector port.

17. An adapter of claim 16, wherein the wireless connector port comprises an infrared port or a radio frequency port.

18. An adapter of claim 12, wherein the devices include a computer, a memory device, a printer, or a modem.

19. An adapter of claim 18, wherein the memory device comprises a read-only memory or a read-and-write memory.

20. An adapter of claim 19, wherein the memory device comprises a ROM chip set, a RAM chip set, a hard disk drive, an optical disk drive, a removal hard disk drive, a tape drive, or a CD family drive.

21. An adapter of claim 12, further comprising a storage means for temporarily storing information received by the connectors.

22. A memory system for a computer, comprising:
    a memory module and an adapter module, wherein the memory module includes a memory housing for storing a memory internal thereto, and the adapter module includes an adapter housing, the housings having complementary communication ports for electrical communication between the two modules, and one of the housings having cartridge retaining means on an outer surface of the housing for retaining at least one memory disk or cassette, the disk or cassette serving to store information and being different from the memory internal to the memory housing, wherein the adapter module includes:

at least three electrical connectors mounted on the housing, each connector being configured to operate in accordance with a respective, first, second, and third different protocol; and conversion means connected to the connectors for converting between said respective first, second and third protocols associated with said at least three connectors, said conversion means having an application specific integrated circuit chip.

23. A memory system of claim 22, wherein the housings have complementary connection means for physically connecting the housings to each other.

24. A memory system of claim 22, wherein the cartridge retaining means comprises rails for slidably receiving the at least one disk or cassette.

25. A memory system of claim 22, further comprising a storage means for temporarily storing information received by the connectors.

26. A method of connecting a plurality of devices for information interchange between the devices wherein at least two of the devices operate in accordance with different interface protocols, comprising:

providing a housing having at least three connectors mounted on the housing, said at least three of the connectors being associated with a respective first, second, and third different interface protocol; and connecting the plurality of devices to the housing, wherein the housing contains conversion means for converting between the respective first, second and third protocols associated with the connectors, said conversion means having an application specific integrated circuit chip.

27. A method of claim 26, wherein at least one of the devices is connected to the housing by means of a standard cable, the cable having connectors at its ends associated with a single interface protocol.

28. A method of claim 26, wherein the housing and at least one of the devices are provided with complementary connectors and the housing and the at least one device are shaped to permit direct engagement between the complementary connectors, the method further comprising connecting said at least one device directly to the housing.

29. A method of claim 28, wherein said at least one device connected directly to the housing is retained relative to the housing by means of complementary engagement formations located on the housing and said at least one device.

30. An adapter for connecting a plurality of devices, comprising:

a housing;

a first, second, and third connector mounted to the housing and being associated with a respective first, second, and third protocol; and a converter, connected between the first, second and third connector and contained within the housing, which converts signals between said respective first, second, and third protocols associated with said first second and third connector, said converter having an application specific integrated circuit chip.

* * * * *